(12) United States Patent
Negishi

(10) Patent No.: US 7,347,426 B2
(45) Date of Patent: Mar. 25, 2008

(54) STAIR-CLIMBING WHEELCHAIR CARRIER

(75) Inventor: Masaaki Negishi, Saitama-ken (JP)

(73) Assignee: Sunwa, Ltd., Sayama-shi (JP)

( * ) Notice: Subject to any disclaimer, the term of this patent is extended or adjusted under 35 U.S.C. 154(b) by 143 days.

(21) Appl. No.: 11/176,650

(22) Filed: Jul. 8, 2005

(65) Prior Publication Data

US 2006/0038360 A1 Feb. 23, 2006

(30) Foreign Application Priority Data

Jul. 12, 2004 (JP) ............................. 2004-204478

(51) Int. Cl.
*B62B 5/02* (2006.01)
(52) U.S. Cl. .................... 280/5.22; 180/8.7; 180/8.2
(58) Field of Classification Search .................. 280/5.2, 280/5.22; 180/8.7, 8.2, 9.21, 9.1
See application file for complete search history.

(56) References Cited

U.S. PATENT DOCUMENTS

| 4,401,178 | A | * | 8/1983 | Studer | 180/8.2 |
| 4,566,550 | A | * | 1/1986 | Misawa | 180/8.2 |
| 4,627,508 | A | * | 12/1986 | Auer | 180/9.22 |
| 4,674,584 | A | * | 6/1987 | Watkins | 180/8.2 |
| 4,687,068 | A | * | 8/1987 | Pagett | 180/8.2 |
| 4,688,813 | A | * | 8/1987 | Misawa et al. | 280/5.22 |
| 4,771,839 | A | * | 9/1988 | Misawa | 180/8.2 |
| 4,898,256 | A | * | 2/1990 | Lehner | 180/8.2 |
| 5,197,558 | A | * | 3/1993 | Misawa | 180/8.2 |
| 6,237,705 | B1 | * | 5/2001 | Nakatani et al. | 180/8.2 |

FOREIGN PATENT DOCUMENTS

EP  0 839 705 A2  5/1998
JP  2551862  8/1996

* cited by examiner

*Primary Examiner*—Tony Winner
(74) *Attorney, Agent, or Firm*—McGinn IP Law Group, PLLC

(57) ABSTRACT

An extension/retraction cylinder stops or starts tilting the platform of the stair-climbing wheelchair carrier based on a detection signal from an inclination sensor provided in the crawler drive unit. When the crawler drive unit is detected to be not tilted, the tilting motion of the platform is stopped at an intermediate angle (e.g. 20°) of a maximum preset angle (e.g. 40°). When the crawler drive unit is detected to be tilted, the platform is tilted up to the maximum preset angle, and as soon as the crawler drive unit is detected not to be tilted after tilting, the platform is driven so as to decrease its inclination angle relative to the crawler drive unit. Thus, a comfortable and usable stair-climbing wheelchair carrier can be provided.

14 Claims, 6 Drawing Sheets

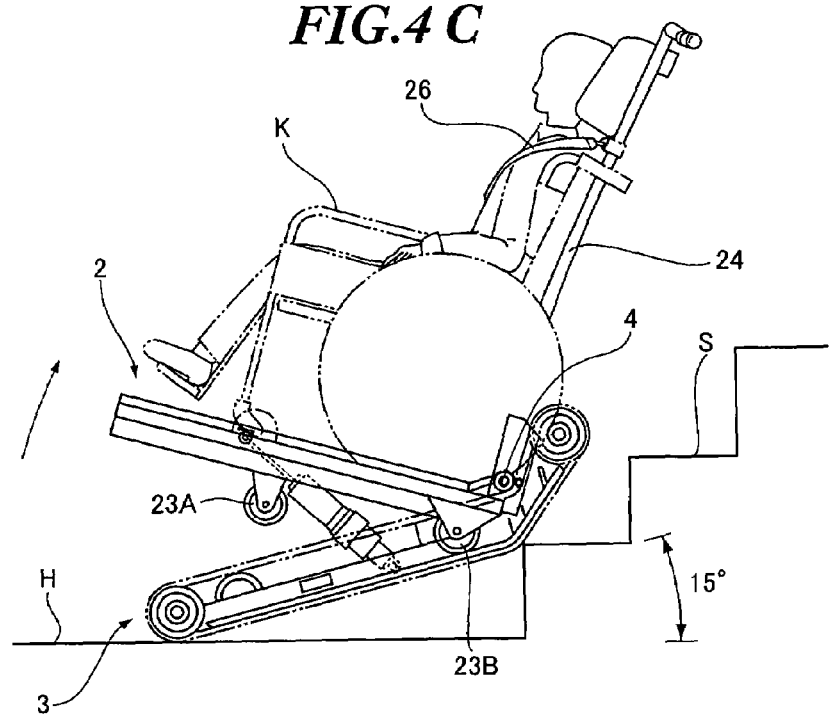
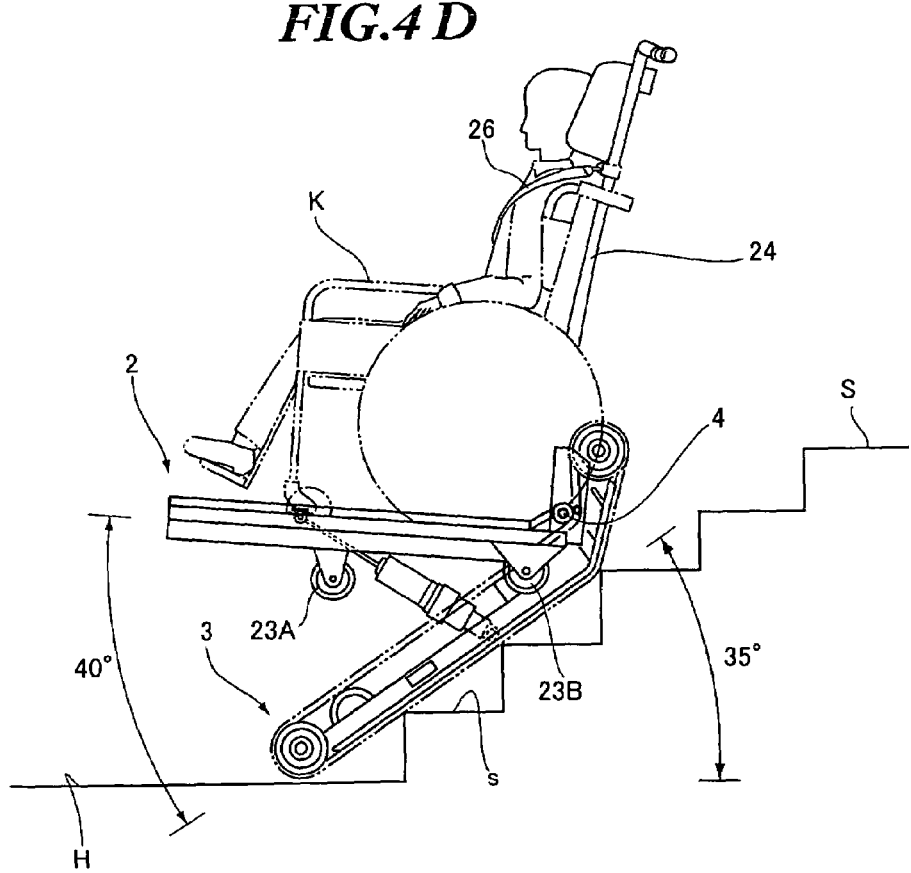

ized space under the
crawler drive unit 3, so that the wheelchair carrier 1 can run
with the wheels 23A and 23B on a level ground.

STAIR-CLIMBING WHEELCHAIR CARRIER

BACKGROUND OF THE INVENTION

The present invention relates to a stair-climbing wheelchair carrier designed to transport a wheelchair up and down stairs.

Japanese Patent No. 2551862 shows a typical stair-climbing wheelchair carrier. This prior art example is first described with reference to FIG. 1A and FIG. 1B, which illustrate the wheelchair carrier moving on a level ground and on stairs, respectively. The wheelchair carrier 1 is generally made up of a wheelchair carrying platform 2 and a crawler drive unit 3. The wheelchair carrying platform 2 is pivoted by a shaft 4 at one end (rear side of the wheelchair K carried thereon) to the crawler drive unit 3. An extension/retraction cylinder 5 is pivoted at one end to the wheelchair carrying platform 2 and at the other end to the crawler drive unit 3, so that the wheelchair carrying platform 2 can be inclined relative to the crawler drive unit 3 by extension and retraction of the cylinder 5.

The wheelchair carrying platform 2 includes a frame 20 that forms a left and right wheelchair carrying floor 21 and a bridge accommodating space 22 therebelow. One end of the above-mentioned cylinder 5 is pivoted to this frame 20. To the frame 20 are attached wheels, for example, one front wheel 23A and two rear wheels 23B. When the cylinder 5 is completely retracted, these wheels make contact with the ground as shown in FIG. 1A, making a space under the crawler drive unit 3, so that the wheelchair carrier 1 can run with the wheels 23A and 23B on a level ground.

A retaining handle 24 stands generally at right angles to the frame 20 near one end of the wheelchair carrying platform 2 (rear side of the wheelchair K carried thereon). At the top of this retaining handle 24 are provided a grip 24A and an operation unit 25. An operator of the stair-climbing wheelchair carrier 1 controls the extension and retraction of the cylinder 5 and the drive of the crawler drive unit 3 through the operation unit 25 while holding the grip 24A. To the retaining handle 24 is attached a safety belt 26 with a buckle 26A, which is worn around the wheelchair user K1 so as to retain the wheelchair K to the retaining handle 24.

The crawler drive unit 3 has a pair of track frames 30 on the left and right which are bent upwards at one end so that they look like a sledge from a side view. The other ends of the left and right track frames 30 are coupled together by a reduction gear case (not shown) in which a drive motor 31 and a reduction gear (not shown) are integrated. These track frames 30 coupled together form the main body of a frame structure, on one end of which a battery 32 that supplies power to the drive motor 31 is mounted.

Drive wheels 34 are attached to drive shafts 33 or output shafts of the reduction gear on the left and right. Crawler belts 36 are trained around the drive wheels 34 and idle wheels 35 attached at the left and right sledge-shaped ends of the track frames 30. The crawler belts 36 move along a ground guide 30A of the track frames 30 and an inclined guide 30B in the sledge-shaped part on the lower side of the crawler drive unit 3, and are pressed down by press rollers 37 pivoted by the shaft 4 on the upper side, so that they make contact with corners of two or more stairs S when moving up and down as shown in FIG. 1B.

To use this conventional stair-climbing wheelchair carrier 1, a bridge (not shown) is drawn out from the bridge accommodating space 22 on a level ground so that the wheelchair K rides onto the bridge and rests on the floors 21 as shown in FIG. 1A. After the safety belt 26 is worn around the wheelchair user K1 and fastened with the buckle 26A, the cylinder 5 is controlled through the operation unit 25 to extend, so that the wheelchair carrying platform 2 is tilted backward relative to the crawler drive unit 3.

When going up stairs, the drive motor 31 is driven through control from the operation unit 25 to cause the sledge-shaped inclined part of the crawler belts 36 of the crawler drive unit 3 to make contact with a first stair of the staircase so that the crawler drive unit 3 rides on the stair and goes up the stairway as shown in FIG. 1B. When going down stairs, the crawler belts 36 are brought into contact with the first stair on the opposite side from the sledge-shaped end of the crawler drive unit 3, and the wheelchair carrier travels down as shown in FIG. 1B.

With this conventional stair-climbing wheelchair carrier, the inclination angle of the wheelchair carrying platform 2 relative to the crawler drive unit 3 when traveling up and down the stairs S as shown in FIG. 1B is set such that the wheelchair K carried on the floors 21 is slightly tilted backward from the vertical. That is, when the maximum inclination angle of stairs that the stair-climbing wheelchair carrier 1 is designed to accommodate is 35°, the wheelchair carrying platform 2 can be inclined up to 40° relative to the crawler drive unit 3. The floors 21 are tilted backward from the horizontal at about 5° when moving up and down the stairs so as to give the wheelchair user K1 the feeling of safety.

However, because of such platform inclination angle setting (e.g. 40° if the stair angle is 35°), the wheelchair carrying platform 2 is largely tilted backward on a level ground or a landing between stairs before or after ascending or descending the stairs. Therefore, the wheelchair user K1 carried on the floors 21 may feel uncomfortable because the wheelchair carrying platform 2 is so tilted backward that the user almost faces the ceiling.

Moreover, when the wheelchair carrying platform 2 is largely inclined backward relative to the generally horizontal crawler drive unit 3, the retaining handle 24 of the wheelchair carrying platform 2 is also inclined backward, requiring a large space at the back. The wheelchair carrier therefore may be unusable in a confined area such as a landing or the like because of lack of operation space.

SUMMARY OF THE INVENTION

An object of the present invention is to solve these problems with the conventional stair-climbing wheelchair carrier and to provide a stair-climbing wheelchair carrier which is both comfortable for wheelchair users and usable for operators.

To achieve the above object, the present invention provides a stair-climbing wheelchair carrier having the following characteristic features.

The stair-climbing wheelchair carrier includes: a crawler drive unit having a crawler belt that can run on stairs and drive means for driving the crawler belt; a wheelchair carrying unit including a wheelchair carrying floor and a retaining handle standing upright at one end for retaining a wheelchair carried thereon, the wheelchair carrying unit being pivoted at the one end by a shaft to the crawler drive unit; and inclining means for inclining the wheelchair carrying unit at a preset angle relative to the crawler drive unit such that the wheelchair carried on the wheelchair carrying floor is slightly tilted backward from the vertical during ascent or descent of the stairs. The inclining means stops or starts tilting the wheelchair carrying unit based on a detection signal from an inclination sensor provided in the crawler drive unit. When the crawler drive unit is detected to be not tilted, the inclining means stops tilting the wheelchair carrying unit at an intermediate angle of the preset angle. When the crawler drive unit is detected to be tilted, the inclining means tilts the wheelchair carrying unit up to the preset angle, and as soon as the crawler drive unit is detected not to be tilted after the ascent or the descent of stairs, the inclining means drives the wheelchair carrying unit to decrease its inclination angle relative to the crawler drive unit.

With this stair-climbing wheelchair carrier, the inclining means stops the tilting motion based on a detection signal from an inclination sensor provided in the crawler drive unit. When the crawler drive unit is detected not to be tilted, i.e., when it is on a flat surface, the inclining means stops the tilting motion of the wheelchair carrying unit at an intermediate angle of the preset angle. The preset angle is an inclination angle at which the wheelchair carried on the floor is slightly tilted backward from the vertical during travel up or down. Therefore, the wheelchair user does not experience discomfort that is caused when the wheelchair on the floor is largely tilted backward on a flat surface.

When the crawler drive unit enters stairs and the inclination sensor provided in the crawler drive unit outputs a detection signal, the inclining means starts tilting the wheelchair carrying unit relative to the crawler drive unit up to the preset angle. The wheelchair on the floor is tilted slightly backward from the vertical during ascent or descent of the stairs. The stair-climbing wheelchair carrier thus transports the wheelchair safely and stably up or down the stairs. By setting the angle at which the inclination sensor outputs a signal smaller than the above-mentioned intermediate angle, it is ensured that, when the crawler drive unit starts climbing up on the stairs, the inclining means starts tilting the wheelchair carrying unit up to the preset angle before the floor becomes inclined forward.

When the crawler drive unit moving up or down the stairs reaches a flat surface such as a floor or a landing, the signal indicating an inclination of the crawler drive unit is switched off, whereupon the inclination angle of the wheelchair carrying unit relative to the crawler drive unit is reduced. Thus, as soon as the crawler drive unit reaches a landing or the like, the inclination angle of the wheelchair carrying unit is immediately decreased and the retaining handle at one end of the wheelchair carrying unit stands up almost vertical. Therefore the stair-climbing wheelchair carrier does not require a large space at the back.

The inclining means may for example comprise an extension/retraction cylinder pivoted at one end to the wheelchair carrying unit and at the other end to the crawler drive unit, and control means for controlling the extension and retraction of this extension/retraction cylinder. With this design, the wheelchair carrying unit can be inclined relative to the crawler drive unit by extension and retraction of the cylinder as with the conventional example described in the foregoing, and the above-described operations can be performed by controlling the cylinder.

The control means may for example be configured with a limit switch fixedly attached to the crawler drive unit and an angle position detector cam that rotates around a pivot shaft between the crawler drive unit and the wheelchair carrying unit in accordance with the inclination of the wheelchair carrying unit and that turns on the limit switch at a predetermined angle. With this control means, the setting of the above-mentioned intermediate angle, at which the tilting motion should be stopped, is achieved by cam designing of the angle position detector cam. The cam designing enables the limit switch to be activated at a predetermined inclination angle, upon which the tilting motion is stopped. The control means is not limited to the above design and may include detecting means for detecting an amount of extension or retraction of the extension/retraction cylinder.

The stair-climbing wheelchair carrier of the present invention having the above-described characteristics provides both comfort for the user and good usability.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENTS

Figure 1:
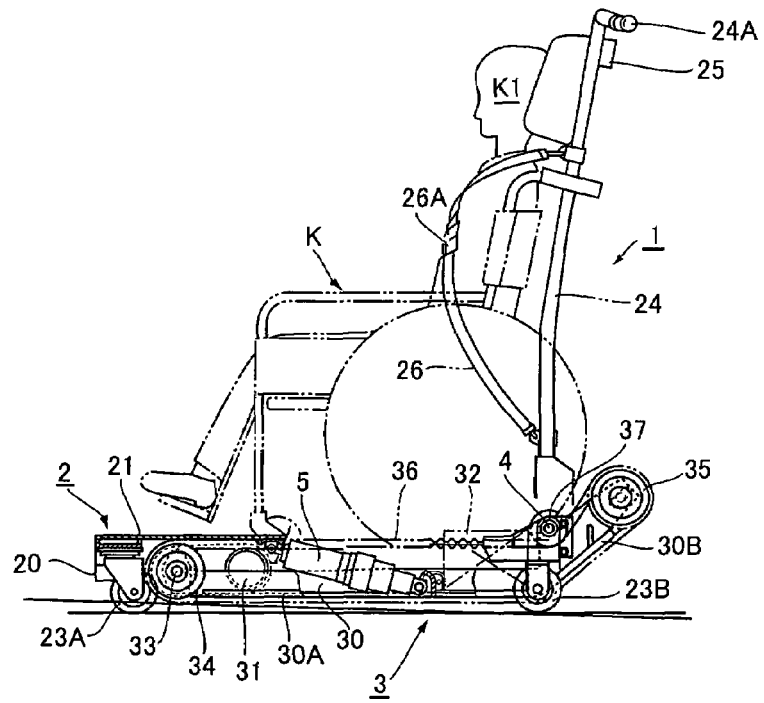
FIG. 1A and FIG. 1B illustrate one prior art example of the present invention.
Figure 1:
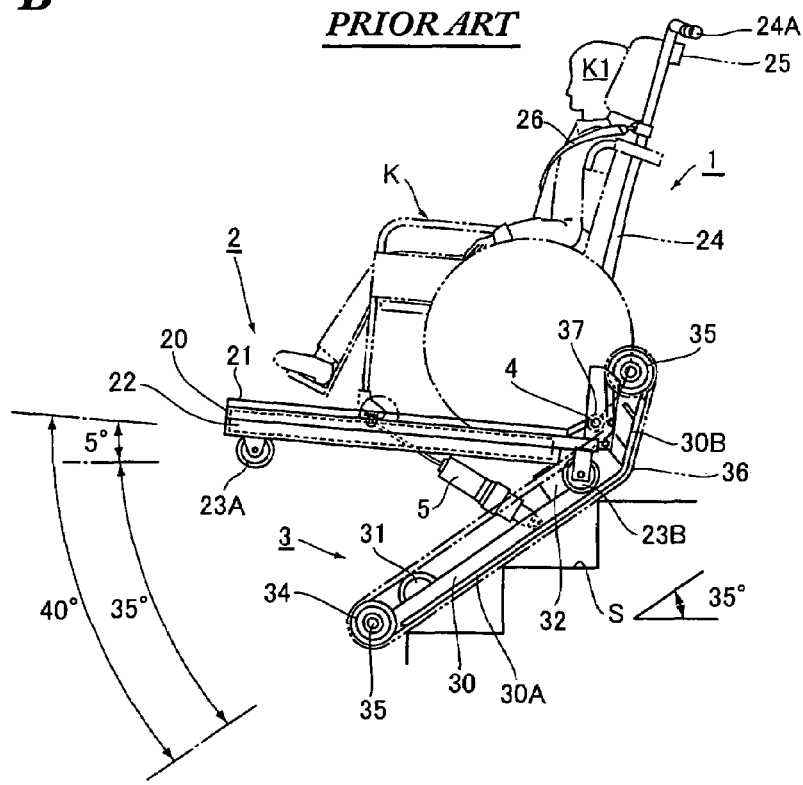
Figure 2:
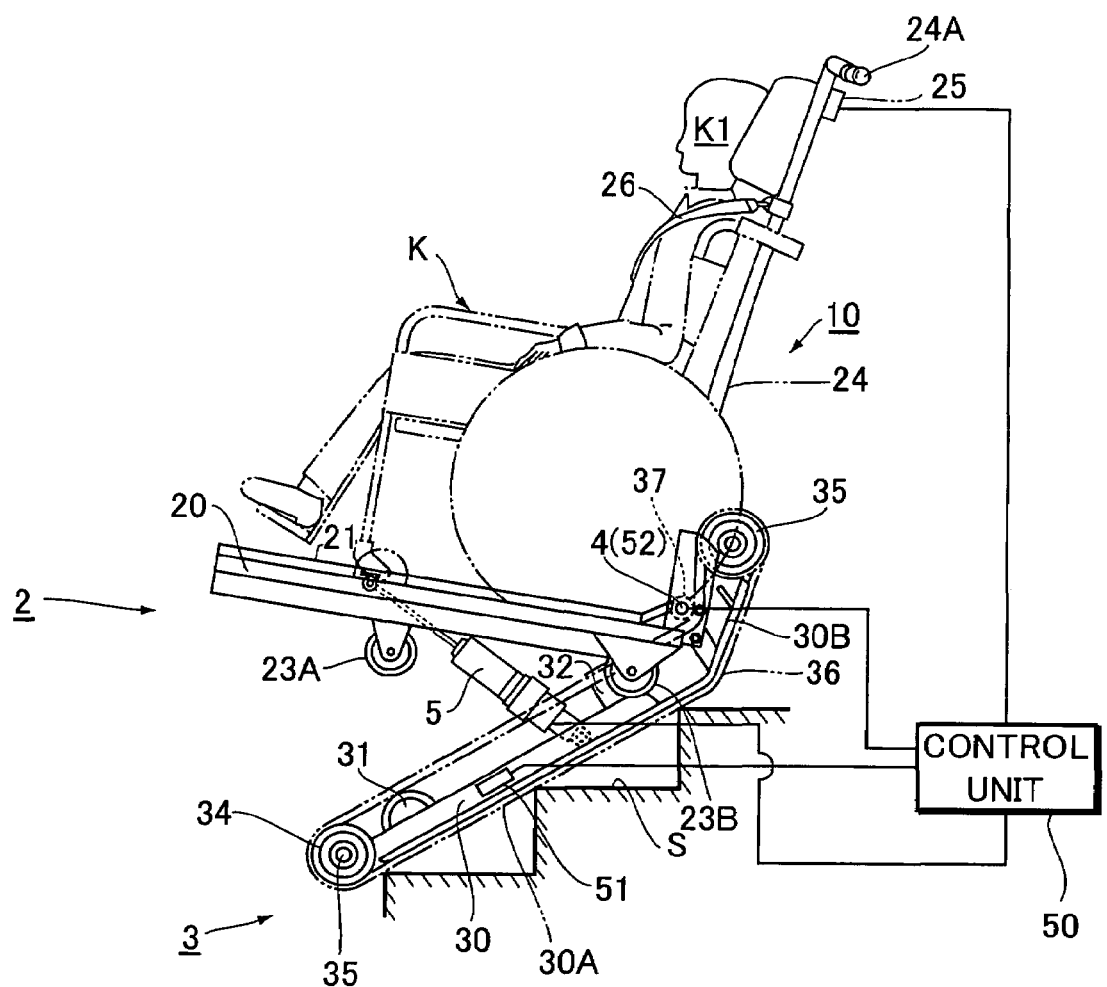
FIG. 2 illustrates one embodiment of a stair-climbing wheelchair carrier of the present invention.

One embodiment of the present invention will be hereinafter described with reference to the drawings. FIG. 2 illustrates one embodiment of a stair-climbing wheelchair carrier 10, which is basically structured the same as the prior art stair-climbing wheelchair carrier described in the foregoing. Same elements therefore are given the same reference numerals and will not be entirely described again.

The stair-climbing wheelchair carrier 10 includes a crawler drive unit 3, a wheelchair carrying platform 2, and inclining means. The crawler drive unit 3 has a crawler belt 36 that can move up and down stairs S and means for driving the crawler belt 36. The wheelchair carrying platform 2 is pivoted by a shaft 4 at one end to the crawler drive unit 3 and includes a wheelchair carrying floor 21 and a retaining handle 24 standing upright at one end of the platform for retaining the wheelchair K carried on the floor. The inclining means inclines the wheelchair carrying platform 2 at a predetermined angle relative to the crawler drive unit 3 such that the wheelchair K on the floor 21 is tilted slightly backward from the vertical during travel up or down.

One example of the inclining means shown here comprises an extension/retraction cylinder 5 pivoted at one end to the wheelchair carrying platform 2 and at the other end to the crawler drive unit 3 and control means for controlling the extension and retraction of the cylinder 5, but the inclining means is obviously not limited to this example. The wheelchair carrying platform 2 may be inclined relative to the crawler drive unit 3 by some other drive means. The control means in this embodiment includes a control unit (control circuit) 50, an inclination sensor 51 provided in the crawler drive unit 3, and an angle position sensor 52 provided such as to rotate around the shaft 4. The extension and retraction of the cylinder 5 are controlled based on signals from the operation unit 25 and from the inclination sensor 51 and the angle position sensor 52.

Figure 3:
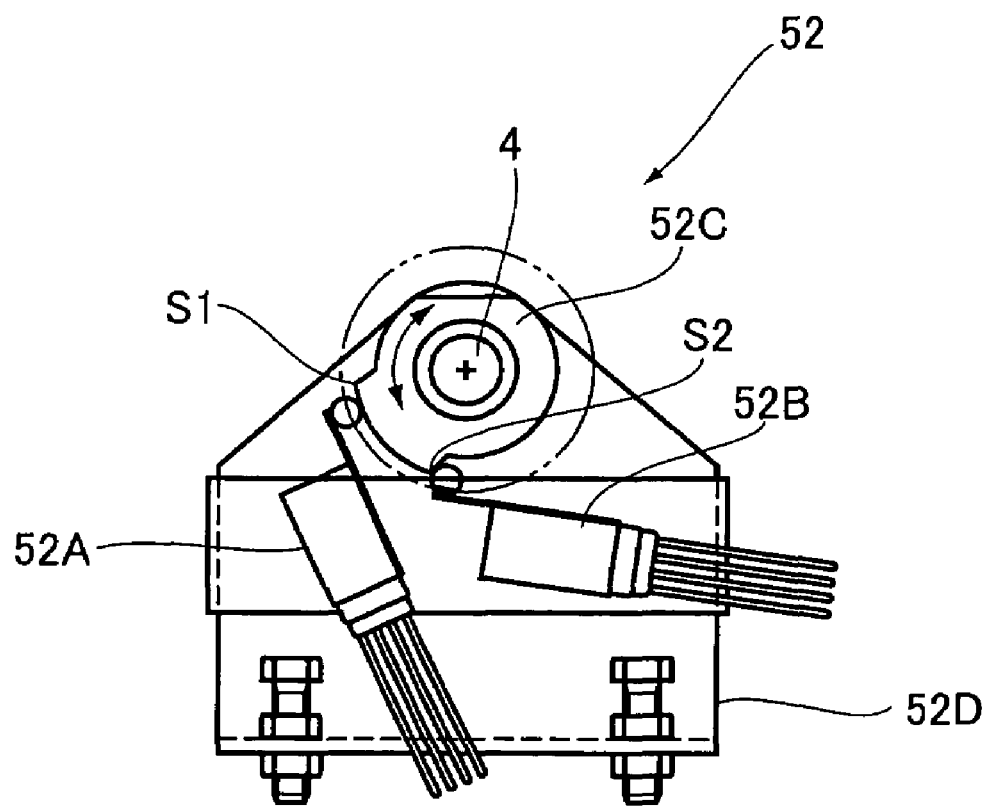
FIG. 3 illustrates one example of an angle position sensor in one embodiment of the present invention.

FIG. 3 illustrates one example of the angle position sensor 52. The sensor 52 includes two limit switches 52A and 52B fixedly attached on the crawler drive unit 3, and an angle position detector cam 52C that rotates around the shaft 4 by which the wheelchair carrying platform 2 is pivoted to the crawler drive unit 3. As the cam 52C rotates in accordance with the inclination of the wheelchair carrying platform 2, it activates the limit switch 52A or 52B at a preset inclination angle. The limit switches 52A and 52B are attached to the crawler drive unit 3 by a fixing member 52D.

The angle position detector cam 52C rotates relative to the limit switches 52A and 52B as the inclination angle of the wheelchair carrying platform 2 relative to the crawler drive unit 3 increases, and turns on the limit switch 52A at position S1, upon which the angle position sensor 52 outputs a signal to stop the cylinder 5. Likewise, the angle position detector cam 52C rotates relative to the limit switches 52A and 52B as the inclination angle of the wheelchair carrying platform 2 relative to the crawler drive unit 3 decreases, and turns on the limit switch 52B at position S2, upon which the angle position sensor 52 outputs a signal to stop the cylinder 5. The sensor for detecting the inclination angle of the wheelchair carrying platform 2 relative to the crawler drive unit 3 is not limited to the one described above. For example, the amount of extension or retraction of the cylinder 5 may be directly detected.

Referring now to FIG. 4A to FIG. 4E, a description will be given below primarily of the operation of the inclining means of the stair-climbing wheelchair carrier 10. FIG. 1A to FIG. 3 should also be referred to for some reference numerals used in the following description.

Figure 4A:
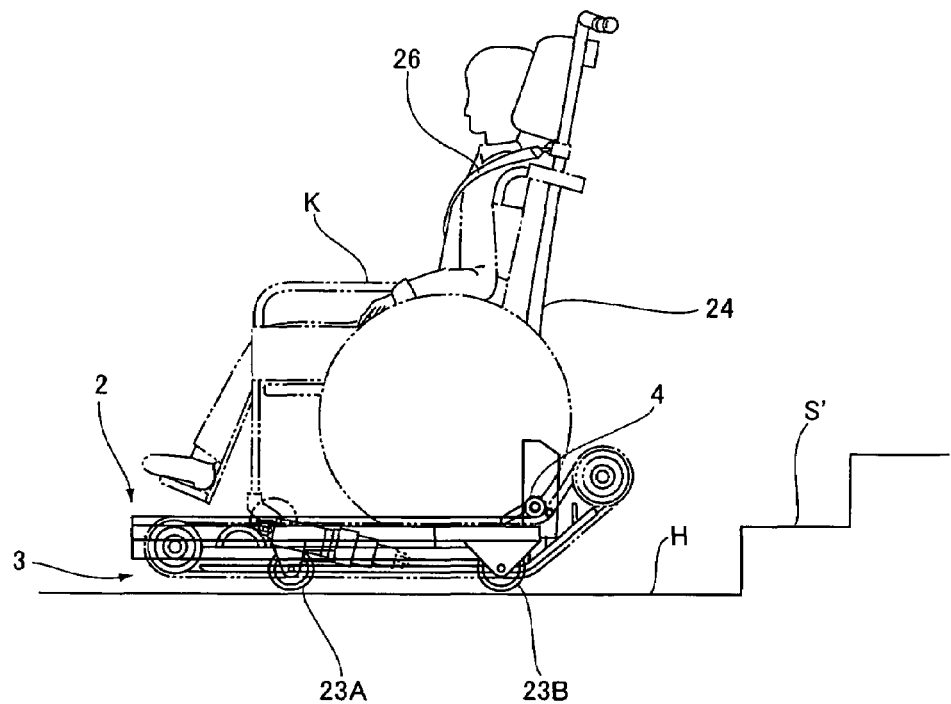
FIG. 4A to FIG. 4E illustrate how the stair-climbing wheelchair carrier of the present invention operates.

FIG. 4A shows the wheelchair carrier moving or transporting on a flat surface H. The cylinder 5 in this state is completely retracted so that the wheels 23A and 23B of the wheelchair carrying platform 2 make contact with the ground. The crawler drive unit 3 is separated from the ground and the wheelchair carrier can run on the wheels 23A and 23B. For carrying a wheelchair K on the wheelchair carrying platform 2, the cylinder 5 is slightly extended through control from the operation unit 25 to cause the crawler belt 36 to make contact with the ground, so as to retain the wheelchair carrier body on the ground. Then, as with the prior art example, a bridge is drawn out from the frame of the wheelchair carrying platform 2, and the wheelchair K is mounted via the bridge onto the floor 21 of the wheelchair carrying platform 2.

After fixing the wheelchair K to the retaining handle 24 with the safety belt 26, the cylinder 5 is driven through control from the operation unit 25 to incline the wheelchair carrying platform 2 relative to the crawler drive unit 3. As the inclination angle of the wheelchair carrying platform 2 relative to the crawler drive unit 3 increases and reaches a predetermined intermediate angle of, for example, 20°, the angle position detector cam 52C turns on the limit switch 52A at position S1 to stop the platform from inclining further (see FIG. 4B).

That is, when inclining the wheelchair carrying platform 2 relative to the crawler drive unit 3 through control from the operation unit 25, if the inclination sensor 51 provided in the crawler drive unit 3 has not detected an inclination of the crawler drive unit 3 relative to the horizontal, the wheelchair carrying platform 2 stops inclining at a preset intermediate angle. Therefore, the wheelchair user carried on the floor 21 does not experience discomfort that is caused by the floor 21 being largely tilted backward.

Figure 4B:
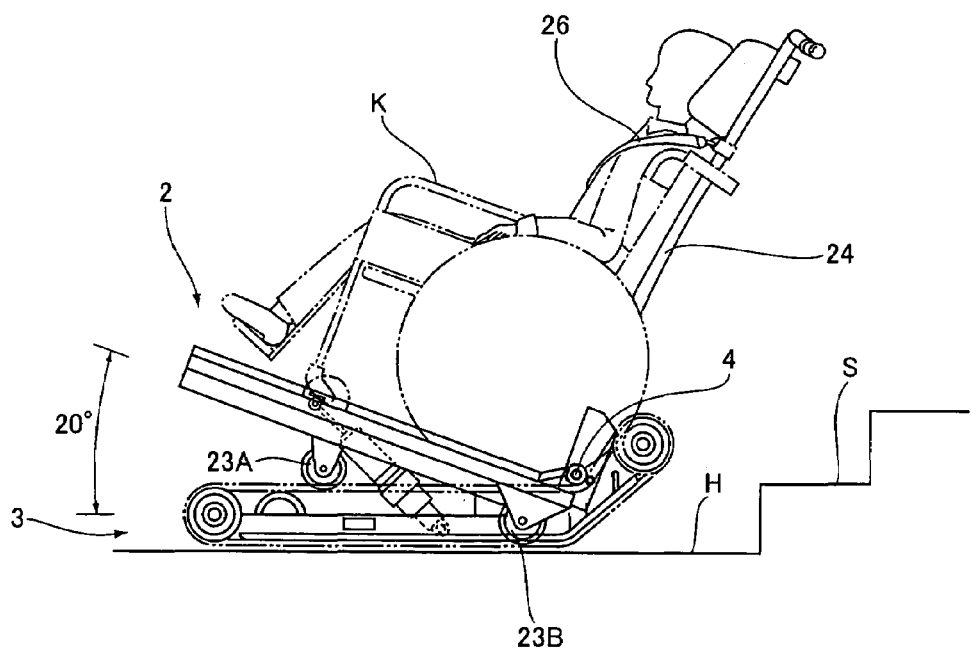
Figure 4:
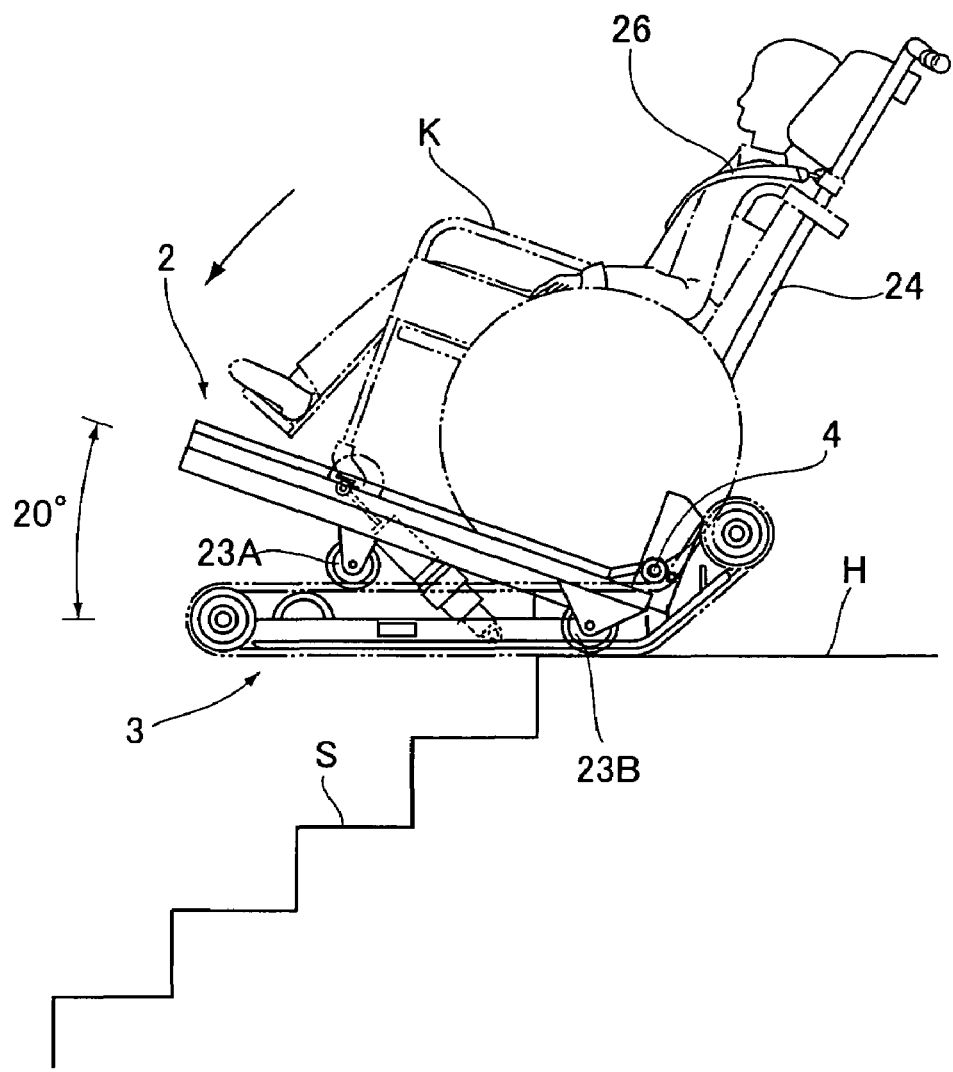

The crawler drive unit 3 is driven then in the state shown in FIG. 4B so that the crawler drive unit 3 rides on the stair S. When the inclination sensor 51 detects that the inclination angle of the crawler drive unit 3 relative to the horizontal has reached a preset angle of, for example, 15°, the cylinder 5 automatically starts extending again based on a signal from the inclination sensor 51, so as to further incline the wheelchair carrying platform 2 relative to the crawler drive unit 3.

While the inclination angle of the crawler drive unit 3 relative to the horizontal gradually increases, the wheelchair carrying platform 2 keeps tilting relative to the crawler drive unit 3 at the same time, and therefore a situation is avoided where the floor 21 is angled downward. By setting the angle at which the inclination sensor 51 outputs a signal (e.g. 15°) smaller than the above-mentioned intermediate angle (e.g. 20°), the wheelchair carrying platform 2 starts tilting again relative to the crawler drive unit 3 before the floor 21 becomes horizontal as the crawler drive unit 3 starts climbing up on the stairs S, and the wheelchair user on the floor 21 does not feel unsafe.

During the transport on the stairs S, the crawler drive unit 3 is inclined relative to the horizontal at the stair angle of, for example, 35° as shown in FIG. 4D. However, since the wheelchair carrying platform 2 can tilt relative to the crawler drive unit 3 up to a maximum preset angle of, for example, 40°, the wheelchair K carried on the floor 21 is tilted slightly backward from the vertical and stably moves up the stairs S.

When the crawler drive unit 3 reaches a flat surface H such as a landing or the like, its inclination angle relative to the horizontal starts decreasing. When the inclination sensor 51 detects that the inclination angle has reached a preset angle, the detection signal is switched off, based on which the wheelchair carrying platform 2 starts to be driven so that its inclination angle relative to the crawler drive unit 3 decreases. As the inclination angle of the wheelchair carrying platform 2 relative to the crawler drive unit 3 decreases, the angle position detector cam 52C turns on the limit switch 52B at position S2, upon which the tilting of platform 2 is stopped (see FIG. 4E).

That is, as soon as the crawler drive unit 3 reaches the flat surface H such as the landing or the like, the wheelchair carrying platform 2 starts decreasing its inclination angle immediately, so that the wheelchair user carried on the floor 21 does not experience discomfort that is caused by a high backward inclination of the wheelchair carrying platform 2. Moreover, the retaining handle 24 stands up quickly and allows sufficient space in a confined area such as a landing to be used for the handling operation.

The above-described procedure applies equally when descending the stairs S. In a state shown in FIG. 4E where the wheelchair carrying platform 2 is inclined at an intermediate angle (e.g. 20°), when the inclination sensor 51 detects an inclination of the crawler drive unit 3 relative to the horizontal, the wheelchair carrying platform 2 starts tilting further relative to the crawler drive unit 3 up to a maximum preset angle (e.g. 40°) as shown in FIG. 4D. When the crawler drive unit 3 reaches a flat surface and the signal from the inclination sensor 51 is switched off, the wheelchair carrying platform 2 quickly reduces its inclination angle.

According to the present invention, the cylinder 5 or the inclining means of the stair-climbing wheelchair carrier 10 stops or starts the tilting motion based on the detection signal from the inclination sensor 51 provided in the crawler drive unit 3. When the crawler drive unit 3 is detected to be not tilted, the tilting motion of the wheelchair carrying platform 2 is stopped at an intermediate angle (e.g. 20°) of a maximum preset angle (e.g. 40°). When the crawler drive unit 3 is detected to be tilted, the platform is tilted up to the maximum preset angle, and as soon as the crawler drive unit 3 is detected not to be tilted, the inclining means drives the wheelchair carrying platform 2 to decrease its inclination angle relative to the crawler drive unit 3. It is therefore prevented that the wheelchair user carried on the floor 21 experiences discomfort that is caused by a high backward inclination of the wheelchair carrying platform 2 on the flat surface H. Moreover, the wheelchair carrier does not need abundant space at the back on a flat surface H. Thus the stair-climbing wheelchair carrier of the present invention provides both comfort for wheelchair users and good usability for operators.

While there has been described what are at present considered to be preferred embodiments of the present invention, it will be understood that various modifications may be made thereto, and it is intended that the appended claims cover all such modifications as fall within the true spirit and scope of the present invention.

What is claimed is:

1. A stair-climbing wheelchair carrier, comprising:
   a crawler drive unit having a crawler belt that can run on stairs and drive means for driving the crawler belt;
   a wheelchair carrying unit including a wheelchair carrying floor and a retaining handle standing upright at one end for retaining a wheelchair carried thereon, the wheelchair carrying unit being pivoted at the one end by a shaft to the crawler drive unit; and
   inclining means for inclining the wheelchair carrying unit at a preset angle relative to the crawler drive unit such that the wheelchair carried on the wheelchair carrying floor is slightly tilted backward from the vertical during ascent or descent of the stairs,
   wherein the inclining means stops or starts tilting the wheelchair carrying unit based on a detection signal from an inclination sensor provided in the crawler drive unit,
   wherein when the crawler drive unit is flat, the inclining means stops tilting the wheelchair carrying unit at an intermediate angle of the present angle,
   wherein when the crawler drive unit is tilted, the inclining means tilts the wheelchair carrying unit up to the preset angle, and
   wherein as soon as the crawler drive unit is detected to be flat after the ascent or the descent of stairs, the inclining means drives the wheelchair carrying unit to decrease its inclination angle relative to the crawler drive unit.

2. The stair-climbing wheelchair carrier according to claim 1, wherein the inclining means comprises an extension/retraction cylinder pivoted at one end to the wheelchair carrying unit and at the other end to the crawler drive unit, and control means for controlling the extension and retraction of the extension/retraction cylinder.

3. The stair-climbing wheelchair carrier according to claim 2, wherein the control means comprises a limit switch fixedly attached to the crawler drive unit and an angle position detector cam that rotates around a pivot shaft in accordance with the inclination of the wheelchair carrying unit and that turns on the limit switch at a predetermined angle.

4. The stair-climbing wheelchair carrier according to claim 2, wherein the control means comprises detecting means for detecting an amount of extension or retraction of the extension/retraction cylinder.

5. The stair-climbing wheelchair carrier according to claim 2, wherein the control means comprises a limit switch attached to the crawler drive unit.

6. The stair-climbing wheelchair carrier according to claim 5, wherein the control means further comprises an angle position detector cam.

7. The stair-climbing wheelchair carrier according to claim 6, wherein the angle position detector cam rotates around a pivot shaft in accordance with the inclination of the wheelchair carrying unit and that turns on the limit switch at a predetermined angle.

8. The stair-climbing wheelchair carrier according to claim 1, wherein the inclining means comprises an extension/retraction cylinder, and an angle position sensor for controlling the extension and retraction of the extension/retraction cylinder.

9. A stair-climbing wheelchair carrier, comprising:
   a crawler drive unit having a crawler belt that can run on stairs and drive means for driving the crawler belt;
   a wheelchair carrying unit including a wheelchair carrying floor and a retaining handle standing upright at one end of the carrying unit for retaining a wheelchair carrier thereon, the wheelchair carrying unit being pivoted by a shaft to the crawler drive unit;
   inclining means provided between the crawler drive unit and the wheelchair carrying unit for setting a first inclination angle of the wheelchair carrying unit relative to the crawler drive unit such that the wheelchair carried on the wheelchair carrying unit floor is kept to be slightly titled backward from the vertical during ascent or descent of the stairs;
   an operation unit provided on the retaining handle for starting and stopping the operation of the inclining means;
   an angle position sensor provided between the crawler drive unit and the wheelchair carrying unit for detecting the first inclination angle and outputting a first signal to stop an operation of the inclining means when the first inclination angle reaches a first predetermined angle or a second predetermined angle, the second predetermined angle being an intermediate angle of the first predetermined angle; and
   an inclination sensor provided in the crawler drive unit for outputting a second signal when a second inclination angle of the crawler drive unit relative to a horizontal direction becomes larger than a third predetermined angle, the third predetermined angle being smaller than the second predetermined angle,
   wherein after starting the operation of the inclining means by the operation unit, the inclining means increases the first inclination angle to the second predetermined inclination angle when the second signal is not outputted, increases the first inclination angle to the first predetermined angle when the second signal is outputted, and decreases the first inclination angle to the second predetermined angle when the second signal is not outputted again, based on the first signal outputted from the angle position sensor, respectively.

10. The carrier according to claim 9, wherein the inclining means comprises an extension/retraction cylinder pivoted at one end to the wheelchair carrying unit and at the other end to the crawler drive unit.

11. The carrier according to claim 10, wherein the angle position sensor comprises detecting means for detecting an amount of extension or retraction of the extension/retraction cylinder.

12. The carrier according to claim 9, wherein the angle position sensor is provided at the shaft and has a limit switch fixedly attached to the crawler drive unit and an angle position detector cam that rotates around the shaft in accordance with the inclination of the wheelchair carrying unit relative to the crawler drive unit and that turns on the limit switch both at the first predetermined angle and the second predetermined angle.

13. A stair-climbing wheelchair carrier, comprising:
a crawler drive unit;
a wheelchair carrying unit which is moved by said crawler drive unit;
an inclining unit for inclining said wheelchair carrying unit at an angle relative to said crawler drive unit;
an inclination sensor provided in said crawler drive unit, wherein said inclining unit stops or starts tilting the wheelchair carrying unit based on a detection signal from said inclination sensor provided in said crawler drive unit; and
an angle position sensor for detecting an amount of movement of said inclining unit.

14. The stair-climbing wheelchair carrier according to claim 13, further comprising a control unit for controlling said inclining unit based on a signal from said angle position sensor.

* * * * *